United States Patent [19]

Giardini et al.

[11] 4,099,499
[45] Jul. 11, 1978

[54] VAPOR TEMPERATURE CONTROLLED EXHAUST GAS HEAT EXCHANGER

[75] Inventors: Dante S. Giardini, Dearborn Heights; Douglas R. Hamburg, Birmingham, both of Mich.

[73] Assignee: Ford Motor Company, Dearborn, Mich.

[21] Appl. No.: 699,004

[22] Filed: Jun. 21, 1976

[51] Int. Cl.² ............................................. F02M 31/00
[52] U.S. Cl. ........................... 123/122 E; 123/122 H; 123/133
[58] Field of Search ................ 123/122 E, 122 H, 133

[56] References Cited

U.S. PATENT DOCUMENTS

| | | | |
|---|---|---|---|
| 1,101,365 | 6/1914 | Weaver | 123/133 |
| 1,267,185 | 5/1918 | Coffman | 123/122 E |
| 1,889,270 | 11/1932 | Thomas | 123/122 H |
| 3,783,841 | 1/1974 | Hirschler | 123/122 E |
| 3,986,486 | 10/1976 | Robbiosi | 123/122 E |
| 4,003,356 | 1/1977 | Naylor | 123/122 E |
| 4,005,693 | 2/1977 | Masaki | 123/122 H |

*Primary Examiner*—Ronald H. Lazarus
*Attorney, Agent, or Firm*—Peter Abolins; Keith L. Zerschling

[57] ABSTRACT

An exhaust gas heat exchanger for vaporizing a liquid fuel is disclosed. The exhaust gas heat exchanger includes exhaust gas flow control valve means, responsive to a vapor temperature, to control the delivery of heated exhaust gases to a heat exchanger coil. A heat exchanger housing is communicated with the exhaust gas conduit of an otherwise conventional internal combustion engine and is provided with means defining a pair of generally parallel exhaust gas flow chambers. A fluid conducting heat exchanger assembly, in the form of one or more helical coils of fluid conducting tubing, is disposed within one of said at least two chambers in the housing. The tubing communicates on an upstream end with a source of liquid fuel and communicates on a downstream end with a vapor reservoir. The heat exchanger coil is arranged to have a maximum surface to volume ratio by including a plurality of individual fluid conduits arranged in side by side relationship.

A diverter valve member is disposed within the housing body and is operative to modulate the portion of the total exhaust gas stream which passes through and over the heat exchanger coil assembly. A vacuum motor actuates the valve member between a pair of stops. The vacuum motor communicates through a vacuum valve with a source of vacuum as the internal combustion engine. The position of the vacuum valve, and hence the position of the diverter valve member, may be controlled by a temperature responsive unit which senses a vapor temperature at any desired vapor temperature location.

2 Claims, 2 Drawing Figures

VAPOR TEMPERATURE CONTROLLED EXHAUST GAS HEAT EXCHANGER

CROSS REFERENCE TO RELATED APPLICATION

This application is related to copending commonly assigned patent application Ser. No. 660,281, filed on Feb. 23, 1976 in the names of J. E. Auiler et al. and titled "Vaporized Liquid Fuel Delivery and Metering Systems".

BACKGROUND OF THE INVENTION

1. Field of the Invention

The present invention is directed to the field of internal combustion engine fuel delivery and metering systems. In particular, the present invention is directed to that portion of the above-noted field which is concerned with the delivery and metering of a liquid fuel to provide a combustible air/fuel mixture for an internal combustion engine. More particularly still, the present invention is directed to that portion of the above-noted field which is concerned with the delivery and metering of a liquid fuel which has been vaporized prior to mixture with an air stream. More particularly still, the present invention is directed to that portion of the above-noted field which is concerned with the vaporization of a liquid fuel in quantities sufficient to maintain the operation of an internal combustion engine in an automotive vehicle environment. More particularly still, the present invention is directed to that portion of the above-noted field which is concerned with the provision of an internal combustion engine waste heat operated liquid fuel vaporizer operative to provide quantities of vaporized liquid fuel sufficient to maintain operation of the internal combustion engine. More particularly still, the present invention is directed to that portion of the above-noted field which is concerned with the provision of an internal combustion engine exhaust gas system situated heat exchanger communicating with a source of liquid fuel and operative, under normal engine operating conditions, to transfer sufficient quantities of heat from the exhaust gas to the liquid fuel within the heat exchanger to provide sufficient quantities of vaporized liquid fuel to sustain engine operation. More particularly still, the present invention is directed to that portion of the above-noted field which is concerned with the provision of means for modulating the temperature of an exhaust gas actuated liquid fuel vaporizer. More particularly still, the present invention is directed to that portion of the above-noted field which is concerned with the provision of a liquid fuel vaporizer positionable within the exhaust gas conduit of an internal combustion engine having means responsive to the temperature of a vaporized liquid fuel to modulate the quantity of exhaust gas being supplied to the liquid fuel vaporizer.

2. Description of the Prior Art

It is well known in the prior art to provide a fuel in liquid form to a moving air stream for delivery to the combustion chambers of an internal combustion engine. The prior art systems generally have utilized mechanical or electromechanical fuel delivery and metering apparatus to provide metered quantities of liquid fuel in proximity to, and in some cases into, the combustion chambers of an internal combustion engine. The prior art has also taught that a quantity of liquid fuel may be added to a quantity of moving air upstream from, and for ultimate delivery to, a plurality of combustion chambers through a plurality of intake manifold conduits. The advent of federally mandated internal combustion engine exhaust emission standards has resulted in the investigation of techniques to substantially reduce the quantity of pollutants produced by an internal combustion engine. One technique proposed to reduce the quantity of atmospheric pollutants generated by an internal combustion engine has been to prevaporize the liquid fuel prior to delivery to the air stream. The basis of this proposal is the improved ability to control, from cylinder-to-cylinder within any one internal combustion engine, the air/fuel ratio of the combustion mixture. Experimental results have indicated that to the extent to which the air/fuel ratio may be controlled more accurately, the ability to implement techniques for the reduction of atmospheric pollutants generated by the internal combustion engine may also be increased.

The prior art contains a substantial number of suggestions directed to the vaporization of a liquid fuel for use in a fuel delivery system for an internal combustion engine. These prior art solutions have generally centered around using the exhaust gases of the internal combustion engine as a source of heat for heating a liquid fuel stream. However, the prior art suggestions have not been wholly technically feasible in terms of providing a vaporized liquid fuel to an internal combustion engine in an automotive environment. In particular, the automotive environment requires that fuel be delivered to the internal combustion engine with mass flow rates which may vary by a factor of 20:1. Any liquid fuel vaporizing system must therefore be capable of accommodating vaporization of liquid fuel which may be consumed by the engine with mass flow rates which vary by 20:1.

A further problem which has not been adequately addressed by the prior art involves the recognition that commercially available gasolines can be expected to be completely vaporized at temperatures above about 425° F. The temperature of the exhaust gases produced by an internal combustion engine can readily be substantially in excess of this value. It is therefore a specific object of the present invention to provide a liquid fuel vaporization apparatus for insertion within the exhaust gas system of an internal combustion engine which apparatus includes means to vary the temperature of the vaporization apparatus. It is also an object of the present invention to provide liquid fuel vaporization apparatus which is adapted to accommodate vaporization of a liquid fuel having a mass flow rate which may vary by a factor of 20:1. In accommodating an engine which may consum masses of fuel which may vary by a substantial margin, the cross referenced copending commonly assigned patent application teaches the use of a variable volume vapor reservoir. It is therefore a further and specific object of the present invention to provide a liquid fuel vaporization apparatus for charging a vapor reservoir.

DETAILED DESCRIPTION OF THE PREFERRED EMBODIMENT

Figure 1:
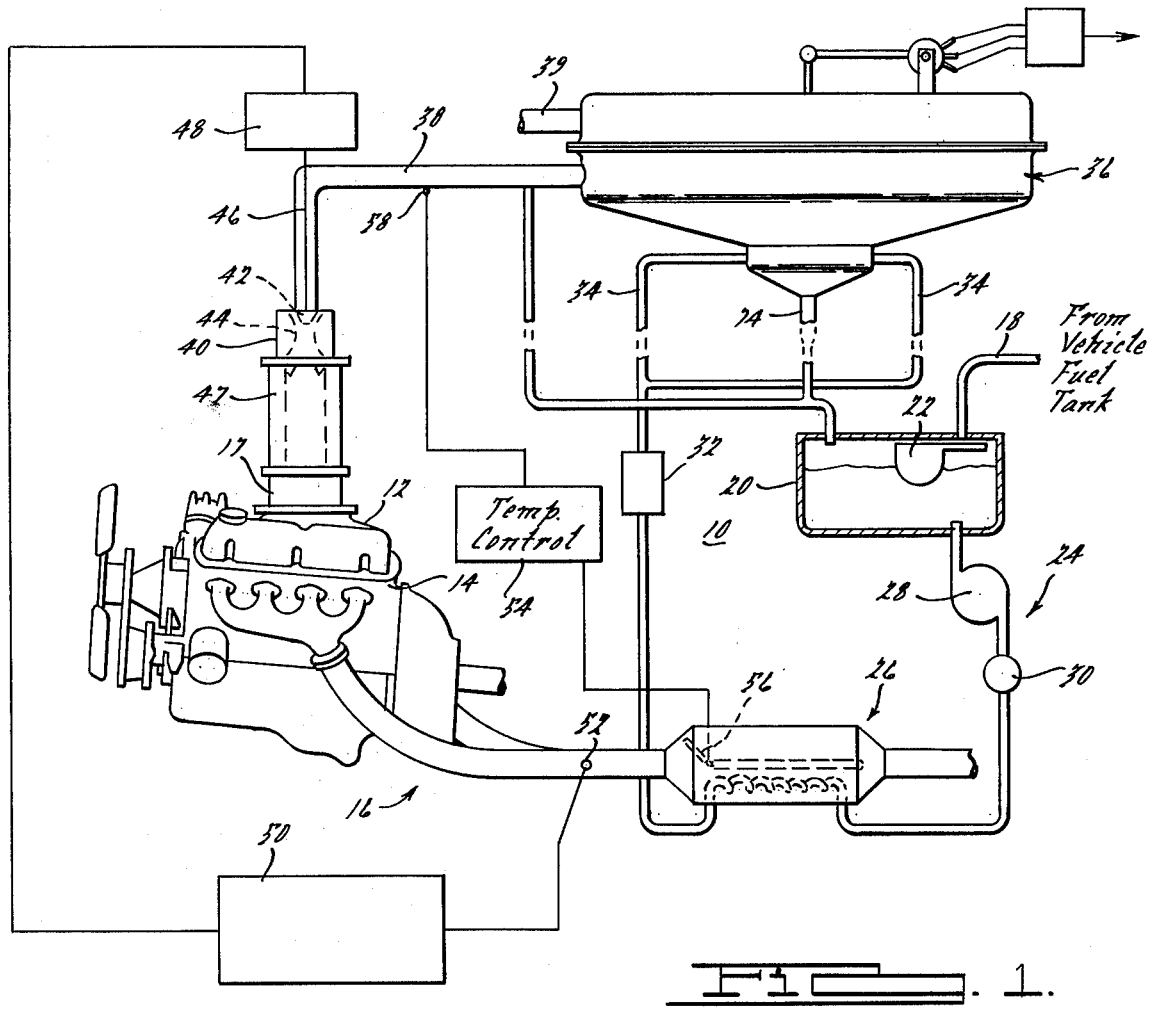
FIG. 1 illustrates a vaporized liquid fuel delivery and metering system with which the present invention is of utility.

Referring now to the drawing wherein like numerals designate like structure throughout the various views thereof, FIG. 1 illustrates a vaporized liquid fuel delivery and metering system 10. The vaporized liquid fuel delivery and metering system 10 is arranged to provide a combustible air/fuel mixture to the intake manifold 12 of an internal combustion engine 14. Internal combustion engine 14 is provided with combustion by-product exhaust gas system or conduit means 16. Intake manifold 12 is provided with throttle body 17. As illustrated, internal combustion engine 14, intake manifold 12, throttle body 17 and exhaust conduit means 16 are substantially conventional. For purposes of illustration, it will be considered that internal combustion engine 14 is of the type adapted for installation and use in powering an automotive vehicle, not shown.

System 10 is arranged to receive liquid fuel from a conventional liquid fuel reservoir or tank, not shown, through conduit 18. Conduit 18 communicates with intermediate liquid fuel reservoir 20. The communication between conduit 18 and intermediate reservoir 20 may be controlled, for example, by a pivoted float valve 22 in the conventional manner. As will be appreciated, liquid fuel could be pumped through conduit 18 by conventional pumping means such as the conventional mechanical or electrical fuel pump normally used in automotive vehicles.

Liquid fuel contained in intermediate reservoir 20 may be provided by coarse liquid fuel delivery means 24 to the primary heating means 26 according to the present invention. Coarse liquid fuel delivery means 24 may include, for example, an electrical or mechanical liquid pump 28 and/or a liquid flow control valve 30. An auxiliary heating means 32 is arranged in fluid serial flow relationship with respect to the primary heating means 26 so that fuel provided from intermediate reservoir 20 would flow serially through the primary heating means 26 and thence through auxiliary heating means 32. The auxiliary heating means 32 are shown to be communicated via conduits 34 to vapor reservoir 36.

As illustrated in FIG. 1, the primary and auxiliary heating means 26, 32 are connected in serial fluid flow relationship. In order for efficient operation of the auxiliary heating means 32, it should be designed for relatively low fuel flow consonant with operation of the associated engine 14 at idle. As such, however, the auxiliary heating means 32 could present a high impedance to fluid flow and could impede engine operation under high fuel consumption conditions. It is therefore contemplated that the primary and auxiliary heating means could be connected in parallel fluid flow. It is also contemplated to provide a fluid by-pass valve downstream from primary heating means 26 and upstream from the auxiliary heating means 32 to place the primary heating means 26 in direct fluid communication with the vapor reservoir 36 when the auxiliary heating means 32 are not required as a vapor supply source.

Vapor reservoir 36 is communicated by way of conduit 38 with carburetor means 40. As used herein "carburetor" means any device for mixing fuel with air to establish a combustible air/fuel mixture. As illustrated in FIG. 1, the vapor delivery nozzle 42 of vapor delivery conduit 38 is positioned within the low pressure zone formed by the metering venturi means 44 of the carburetor means 40. A movable pintle 46 is situated within the vapor delivery nozzle 42 and is controlled by servomechanism means 48. Carburetor means 40 includes mixing section 47 which intercommunicates the metering venturi means 44 with the throttle body 17 and the intake manifold 12.

Servomechanism 48 may be for example a conventional servomotor operated electrically or by electromechanical means. Servomechanism 48 receives an input command signal from servomechanism control means 50. As here illustrated, servomechanism control means 50 are arranged to be responsive to an exhaust gas sensor 52 which may for example, a titania exhaust gas sensor according to U.S. Pat. No. 3,886,785. According to FIG. 1, fuel delivery and metering system 10 is also provided with temperature control means 54. Temperature control means 54 are arranged to be responsive to the vapor temperature in vapor delivery conduit 38 in order to control an exhaust gas flow diverter valve 56 which is described in greater detail hereinbelow with reference to FIG. 2.

Figure 2:
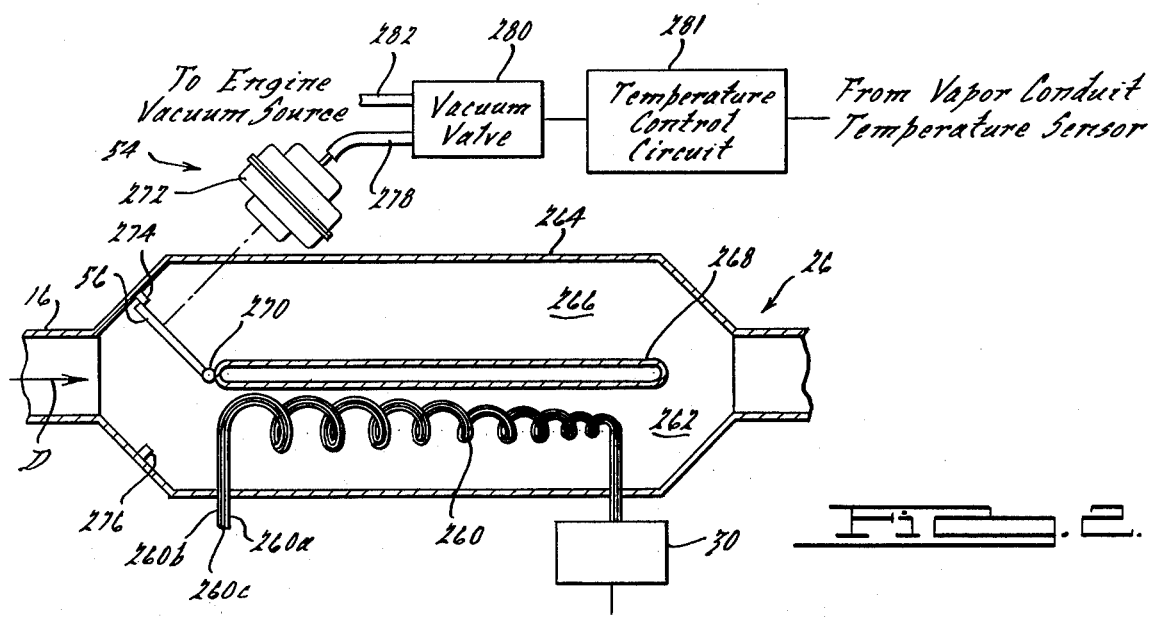
FIG. 2 illustrates the liquid fuel vaporizer according to the present invention in a partly schematic, partly sectional view.

Referring now to FIG. 2, the primary liquid fuel heater means 26 according to the present invention is illustrated in a partly schematic, partly sectional, partly diagrammatic view. Primary heater means 26 comprise a helical coil 260 of fuel conduit which is disposed within heating chamber 262 of a bi-chambered housing 264. Housing 264 is here shown to be formed as a portion of exhaust gas conduit 16. In order to achieve a high surface-to-volume ratio for heat exchanger coil or helix 260, consonant with rapid liquid vaporization of liquid fuel within coil 260, a plurality of fuel conduits 260a, 260b and 260c are shown as being utilized in fabricating heat exchanger coil or helix 260. Each fuel conduit 260a, 260b, 260c is preferably fabricated out of a thin walled material having good heat transfer capability and the ability to withstand the corrosive environment of the exhaust system 16. We have found stainless steel tubing to be suitable. The coil 260 may be formed on a mandrel by any of the well known techniques. The individual conduits 260a, 260b, and 260c are would in side-by-side alignment and may be welded or otherwise bonded together to equalize the temperature gradients between individual coils. Housing portion 264 includes a generally centrally disposed baffle means 268 to define an exhaust gas flow chamber 266 which is separated from the heat exchanger chamber 262.

The flow of exhaust gases, in the direction of arrow D, through heat exchanger chamber 262 within exchanger housing 264 is here controlled by exhaust gas flow diverter valve 56. Exhaust gas flow diverter valve 56 is pivotally connected as at 270 to the central baffle 268 and is positioned in response to the vapor temperature responsive valve control means 54. Temperature responsive valve control means 54 include a conventional vacuum motor means 272, vacuum valve 280 and temperature control circuit means 281.

Exhaust gas flow diverter valve 56 is mechanically linked or coupled to vacuum motor 272. Vacuum motor 272 is operative to pivotally rotate diverter valve 56 between the positions denoted by stops 274, 276 on the side wall of housing 264. Vacuum motor 272 is communicated by vacuum hose 278 to vacuum valve 280. Vacuum valve 280 communicates with source of vacuum through vacuum conduit 282. The vacuum source may conveniently be an appropriate portion of the engine 14. Vacuum valve 280 may be, for example, a solenoid operated valve to selective communicate vacuum motor 272 with a vacuum source in response to electrical signals applied by temperature control circuit means 281. Vacuum valve 280 is responsive to temperature control circuit means 281 to command vacuum motor 272 to actuate exhaust valve 56. By actuating exhaust flow control valve 56 to a position in substantial abutment with stop 276, the flow of exhaust gas will be diverted from passage through chamber 262 which includes heat exchanger coil 260 to passage through chamber 266. Temperature control circuit means 281 may be arranged to be responsive to a thermistor 58. Thermistor 58 may be located, for example, within vapor conduit 38. Alternatively, thermistor 58 could be in thermal exchange contact with the vapor within vapor reservoir 36 or with any other convenient structural member having a temperature which is indicative of the temperature of the vapor within the vapor delivery portion of the fuel delivery and metering system 10.

By way of example, temperature responsive circuit means 281 may include an electrical bridge circuit which includes, as a portion thereof, the thermistor 58 and an electronic comparator circuit to establish the minimum desired vapor temperature. Such circuits are well known in the art. As thus described, vacuum motor 272 and exhaust diverter valve 56 may be cooperative to cause substantially all of the exhaust gas flow to pass through the chamber 262 and hence over heat exchanger coil 260 or to pass through by-pass chamber 266. With the diverter valve 56 in an intermediate position, a portion of the exhaust flow may pass through each chamber. Since placement of the diverter valve 56 in the extreme positions could ordinarily be expected to result in substantial temperature variation of the vapor being provided to vapor reservoir 36, the thermal inertia of the heat exchanger coil 260, the central baffle 268 and the thermal coupling between the two chambers of the housing may be selected to give adequate temperature smoothing commensurate with acceptable heat exchanger warm-up and good transient response times.

We have found that good results can be obtained with a primary heater means 26 according to the present invention having a fuel volume within the vaporizer section, coil 260, of about 1% of the displacement of the associated engine. We have also found that sufficient heat will be present within chamber 262 after about 20 seconds of engine operation (at an ambient temperature of about 70° F.) to fully vaporize liquid fuel flowing through fuel conduits 260a, 260b, 260c. It will be appreciated that heat-up time will be, at least in part, a function of the proximity of the primary heating means 26 to the engine 14 and the ambient temperature.

We claim:

1. The method of providing a vaporized liquid fuel to an internal combustion engine, comprising the steps of:
   providing a closed flow of fluid fuel from a liquid fuel reservoir means to a fuel vapor storage means;
   generating a flow of heated gaseous medium;
   causing said gaseous medium to flow in heat exchange relation to the flow of fluid fuel at a location intermediate the storage means and the reservoir means and at a temperature sufficient, considering minimum fluid fuel dwell time, to heat and completely vaporize the liquid fuel;
   sensing a fuel temperature downstream, in the fuel flow direction, from the fuel heating location;
   modulating the heat exchange transfer rate between the gaseous medium flow and the fluid fuel in response to sensed temperature whereby the temperature of the generated fuel vapor may be maintained within a desired range;
   sensing the quantity of fuel vapor resident in the vapor storage means; and
   modulating the heat exchange transfer rate between the fluid fuel flow and the gaseous medium flow in response to sensed vapor quantity whereby the quantity of fuel vapor within the vapor storage means may be maintained within a desired range.

2. The method according to claim 1 wherein the step of modulating the heat exchanger transfer rate in response to sensed vapor quantity comprises the step of modulating the rate of delivery of liquid fuel to the heating location.

* * * * *